United States Patent
Ette et al.

(10) Patent No.: US 11,430,267 B2
(45) Date of Patent: Aug. 30, 2022

(54) METHOD AND DEVICE FOR DETECTING A USER INPUT ON THE BASIS OF A GESTURE

(71) Applicant: VOLKSWAGEN AKTIENGESELLSCHAFT, Wolfsburg (DE)

(72) Inventors: Bernd Ette, Wolfsburg (DE); Volker Wintsche, Dresden (DE); Christian Gaida, Freital (DE)

(73) Assignee: Volkswagen Aktiengesellschaft

( * ) Notice: Subject to any disclaimer, the term of this patent is extended or adjusted under 35 U.S.C. 154(b) by 287 days.

(21) Appl. No.: 16/625,310

(22) PCT Filed: Jun. 18, 2018

(86) PCT No.: PCT/EP2018/066139
§ 371 (c)(1),
(2) Date: Dec. 20, 2019

(87) PCT Pub. No.: WO2018/234251
PCT Pub. Date: Dec. 27, 2018

(65) Prior Publication Data
US 2022/0004746 A1    Jan. 6, 2022

(30) Foreign Application Priority Data
Jun. 20, 2017    (DE) ............ 10 2017 210 317.5

(51) Int. Cl.
*G06K 9/00* (2022.01)
*G06V 40/20* (2022.01)
(Continued)

(52) U.S. Cl.
CPC ............ *G06V 40/28* (2022.01); *G06F 3/017* (2013.01); *G06T 7/11* (2017.01); *G06T 7/50* (2017.01); *G06T 2207/30196* (2013.01)

(58) Field of Classification Search
CPC .......... G06F 3/017; G06F 3/011; G06F 21/32; G06F 3/0482; G06F 3/005;
(Continued)

(56) References Cited

U.S. PATENT DOCUMENTS

| 6,128,003 A | 10/2000 | Smith et al. |
| 7,574,037 B2 | 8/2009 | Hidai et al. |

(Continued)

FOREIGN PATENT DOCUMENTS

| CN | 103294996 A | 9/2013 |
| CN | 106446911 A | 2/2017 |

(Continued)

OTHER PUBLICATIONS

Search Report for International Patent Application No. PCT/EP2018/066139; dated Aug. 16, 2018.
(Continued)

*Primary Examiner* — Alex Kok S Liew
(74) *Attorney, Agent, or Firm* — Barnes & Thornburg, LLP

(57) ABSTRACT

A method which includes detecting a user input based on a gesture, acquiring image data and performing segmentation based on the acquired image data, and determining an object with an outline. A reference point is determined based on the object, a distance between each of a number of points located on the outline of the object and the reference point is determined and a measured distance profile is generated based on these distances. A gesture is determined based on the measured distance profile and an output signal is generated and output based on the gesture determined. A device for detecting a user input based on a gesture including an acquisition unit, a segmentation unit, a profile computing unit, an allocation unit, and an output unit (8).

28 Claims, 4 Drawing Sheets

(51) Int. Cl.
*G06T 7/50* (2017.01)
*G06T 7/11* (2017.01)
*G06F 3/01* (2006.01)

(58) Field of Classification Search
CPC .. G06F 3/04883; G06F 3/013; G06F 3/04842; G06F 3/04886; G06F 16/583; G06F 3/04817; G06F 21/36; G06F 3/012; G06F 3/023; G06F 3/04847; G06F 3/0488; G06F 16/183; G06F 16/24575; G06F 16/25; G06F 16/252; G06F 16/5838; G06F 16/951

See application file for complete search history.

(56) References Cited

U.S. PATENT DOCUMENTS

| | | | |
|---|---|---|---|
| 9,483,707 B2 | 11/2016 | Chen | |
| 9,857,589 B2 | 1/2018 | Lundberg | |
| 2003/0208289 A1* | 11/2003 | Ben-Arie | G06V 40/20 700/83 |
| 2005/0271279 A1* | 12/2005 | Fujimura | G06V 40/28 382/209 |
| 2008/0181459 A1 | 7/2008 | Martin et al. | |
| 2011/0267258 A1 | 11/2011 | Wang et al. | |
| 2012/0068917 A1 | 3/2012 | Huang et al. | |
| 2012/0069168 A1 | 3/2012 | Huang et al. | |
| 2013/0057469 A1 | 3/2013 | Ajika | |
| 2014/0168061 A1 | 6/2014 | Kim | |
| 2015/0128094 A1* | 5/2015 | Baldwin | G06F 3/017 715/863 |
| 2015/0253863 A1 | 9/2015 | Babin et al. | |
| 2015/0253864 A1 | 9/2015 | Parkhomenko et al. | |
| 2016/0132124 A1 | 5/2016 | Nakamura et al. | |

FOREIGN PATENT DOCUMENTS

| | | |
|---|---|---|
| DE | 4438643 A1 | 5/1996 |
| DE | 19802261 A1 | 7/1999 |
| DE | 602004004048 T2 | 7/2007 |
| DE | 102015103022 A1 | 8/2016 |
| DE | 102015202922 A1 | 8/2016 |
| WO | 2012088702 A1 | 7/2012 |
| WO | 2013085525 A1 | 6/2013 |
| WO | 2014128789 A1 | 8/2014 |

OTHER PUBLICATIONS

International Preliminary Report on Patentability for International Patent Application No. PCT/EP2018/066139; dated Jan. 2, 2020.

* cited by examiner

METHOD AND DEVICE FOR DETECTING A USER INPUT ON THE BASIS OF A GESTURE

PRIORITY CLAIM

This patent application is a U.S. National Phase of International Patent Application No. PCT/EP2018/066139, filed 18 Jun. 2018, which claims priority to German Patent Application No. 10 2017 210 317.5, filed 20 Jun. 2017, the disclosures of which are incorporated herein by reference in their entireties.

SUMMARY

Illustrative embodiments relate to a method for detecting a user input on the basis of a gesture. Illustrative embodiments also relate to an apparatus for detecting a user input on the basis of a gesture.

BRIEF DESCRIPTION OF THE DRAWINGS

The disclosed embodiments will now be explained with reference to the drawings.

DETAILED DESCRIPTION

Figure 1:
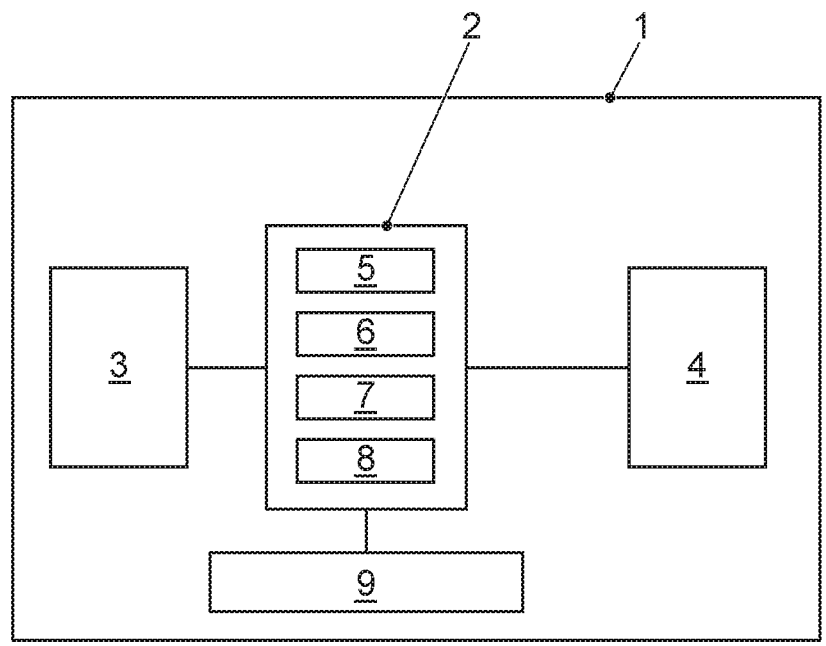
FIG. 1 shows a transportation vehicle with an exemplary embodiment of the disclosed apparatus.

The large number of electronic devices that are used in many areas of private and professional life make the development of technologies for their easy operation an urgent task. One approach to this is that of operating them by gesture control, while this also involves challenges in creating an input possibility that can be conveniently used in everyday situations.

The method for object detection by ultrasound that is described in DE 44 38 643 A1 involves workpieces being located and detected. This is accomplished by determining different reflection profiles, comparison of which allows statements to be made about the geometry of the object surface. The trend in the profiles further exhibits features that are used for classifying and identifying the workpieces.

DE 198 02 261 A1 proposes a method for signal processing for time series of digitized images that involves objects being detected and the motion thereof analyzed. This is accomplished by using neural networks with a time delay.

The method for detecting a known object in the field of view of a three-dimensional machine vision system that is described in DE 10 2015 103 022 A1 provides for an image file to be used to determine features in two operations, the operations involving the relevant search space for the comparison with known objects being reduced in size and the search made easier in this way. Histograms are used to extract a distribution of colors and edge directions from the image file, and shape functions are also ascertained.

The method for object detection described in DE 60 2004 004 048 T2 involves an image being scanned, with the size of the window used for the scanning being varied to detect objects of different sizes. In deciding whether an object is detected, the window sizes are used to calculate and compare multiple estimates.

The method for providing a mechanism for gesture recognition that is described in WO 2012/088702 A1 involves a series of images being divided into blocks, and a motion status is determined for the blocks. To ascertain the direction of movement of an object, the movement of edges is considered in a histogram generated on the basis of the motion status of the blocks.

WO 2013/085525 A1 proposes techniques for gesture detection that involve the number of pixels to be analyzed in captured images being reduced by stereo capture. This is accomplished by determining, for example, an image region in which a movement of an object is to be detected.

A limiting factor for the known methods however is often that reliable detection of a captured gesture requires the expenditure of considerable computation power that is often not available in mobile devices, for example, in the field of transportation vehicle technology.

Disclosed embodiments provide a method and an apparatus of the type stated at the beginning that make a quick, reliable and computationally less intensive detection of gestures possible.

This is achieved by a method and an apparatus.

The disclosed method for detecting a user input on the basis of a gesture involves image data being captured. The captured image data are used to perform a segmentation, wherein an object with an outline is determined. The object is used to determine a reference point and a distance to the reference point is respectively determined for a multiplicity of points on the outline of the object. The distances are used to generate a measured distance profile and the measured distance profile is used to determine a gesture. The gesture determined is used to generate and output an output signal.

The detection of the gesture in this case takes place on the basis of a measured distance profile, which may be characterized on the basis of particularly simple features. This has the effect that the method can be performed particularly quickly and economically in terms of resources and with little computing power. Moreover, image data with a particularly low resolution can be used for the gesture detection.

A "gesture" is understood within the context of the disclosure as meaning a specific position of an input object, for example, a hand or other body part of a user, or a specific movement carried out with the input object. This involves the position and/or orientation of the input object in space being taken into consideration. Furthermore, there may be provision for the input object to have multiple objects, for example, the fingers of a hand, that are movable independently of one another to a certain extent, so that in addition to the position and/or movement of the input object it is also possible for the position and orientation of the elements of the input object to be taken into consideration. The input object can further comprise an item that can be carried by a hand of a user and positioned in space, for example, such as a pen or other body, for example.

The gestures may be configured in a manner known per se. They comprise pointing gestures, swiping gestures and gestures in everyday use, for example, hand rotations, gripping gestures and combinations of several such gestures, possibly carried out in immediate quick succession. Gesture control therefore provides the user with a particularly simple and intuitive input possibility.

The gestures are carried out in a capture space, in particular, without the user having to approach or make contact with a specific tangible object in the process. In further exemplary embodiments, there is provision for the gesture to comprise contact with a tangible object, the gesture being captured completely during the contact, for example, along a touch-sensitive surface.

The gesture can further be assigned directional information, which is determined on the basis of direction of a movement or an orientation of the gesture. Such a gesture may be formed analogously to an operator using an analog operating element, for example, analogously to pushing or rotating an operating element, but with no actual displacement or rotation of a physical operating element taking place, but rather such a pattern of movement merely being followed as a result of the movement of the input object in the capture space. Such gestures are typically able to be noticed particularly easily by the user. Such a method moreover affords the benefit that the user does not have to touch a specific surface region—as in the case of a switch or rotary knob, for example, Rather, it suffices for him to move the input object, for example, his hand, into the capture area and to carry out the applicable gesture therein.

In at least one exemplary embodiment of the disclosed method, the captured image data comprise an at least partial depiction of a hand and the gesture corresponds to a number of extended fingers of the hand. This allows the gesture to be carried out by the hand of the user, so that an additional input object does not need to be used. The gesture is furthermore particularly easily performable by the user. As an alternative or in addition to taking into consideration the number of extended fingers, there may be provision for gestures in which a specific finger, for example, the index finger, or multiple fingers in combination are extended, for example, the thumb and index finger at the same time or the index and middle fingers of one hand. In further exemplary embodiments, other input objects can be used instead of a hand and the fingers thereof.

The gesture may further be divided into multiple phases, wherein there may be provision for at least one phase to be captured contactlessly in the capture space. The phases may be in a form such that operation is implemented in multiple operations. By way of example, the gesture can comprise a first phase, which is interpreted as selection of a function, and at least one further phase, in which an adjustment is made by the selected function.

The method initially involves image data being captured, for example, by a camera system. This involves defining a capture space, for instance, the physical region in which image data are capturable by the camera system, or a physical region to which the capture or evaluation of the captured image data is restricted.

The image data comprise spatially resolved information, in particular, about a multiplicity of image points that are arranged in a matrix. This information can be of different types, for example, the intensity or another feature of a detected electromagnetic radiation or information obtained by ultrasound. The image data can further be captured for the image points simultaneously or in succession, for example, by an image sensor having a multiplicity of image points or by a scanner for capturing the image points in succession. The image data may, for example, comprise a frame or multiple frames with an associated time. Temporally resolved video data may be captured in the capture space. A time is associated with a frame in a manner known per se in this case, an image produced by a scanning process also being able to be assigned an individual time, even though the individual image points were not captured completely simultaneously, but rather in succession.

Furthermore, there may be provision for a gesture capture device formed in another manner, for example, with a resistive and/or capacitive surface by which at least a first phase of a gesture can be captured.

When capturing the image data, it is further possible for signal conditioning known per se to be performed, for example, improvement of the image quality, smoothing, filtering, calibration or other measures. Furthermore, image information can be read in, for example, concerning a time assigned to a frame.

In one development, the image data comprise picture elements and the picture elements have associated distance information. This allows the input object to be detected particularly reliably within the image data.

There may be provision for the image data to be captured by a Time-of-Flight camera (ToF camera). This involves a light pulse, typically in the infrared range, being transmitted and the light reflected by objects within a capture space is detected. The light source and the detector are typically arranged close together. A time offset between the sending and receiving of the light pulse and, from that, the distance of the object relative to the camera are determined. In this manner, distance information can be captured for each picture element.

This further permits filtering of the captured image data on the basis of the distance information, for example, to only take into consideration image data within a particular range and to reject a detected background, for example. This allows the capture space in which the gesture is captured to be accurately prescribed, to capture space being determined dynamically, in particular, for example, after the distance of the input object from the sensor has been estimated in a first operation. Feature elements with distance information indicating a reflection by an object outside the defined capture space can be filtered out in this manner. In comparison with other systems, it is moreover also possible for objects having low reflectivity to be reliably detected, since the sensitivity of typical ToF systems is sufficient to detect a weak reflection.

In further exemplary embodiments, the image data with distance information can be captured by other methods, for example, by ultrasound or a stereo camera.

The captured image data are used to perform a segmentation, involving an object with an outline being determined. "Segmentation" is understood according to the disclosure as meaning the determination of associated image regions. This involves taking into consideration image data that are associated with the same time, for example, the image data of a frame. The frame comprises image points (picture elements, pixels) arranged as a matrix, for example. The segmentation then involves associated picture elements being determined in a manner known per se, the picture elements forming a coherent region within a frame and being considered as an object. An outline is determined for the object, the path of the outermost image points being determined. For example, an object detected in the segmentation represents a portrayal of an input object.

The segmentation can further involve objects that are not to be detected being determined, that is to say regions within the image data that are not assignable to an input object and that make no contribution to the detection of a gesture. Picture elements associated with such regions can be filtered out, in particular, by a multistage method. This is performed in a manner known per se, for example, on the basis of upper and/or lower threshold values for the surface or other features of the object. Furthermore, it is possible for further elements of the image data to be filtered out, for example, the wrist and the arm in the case of a gesture carried out by a hand.

In a further development, an angle of inclination of the object is determined and an equalizing transformation is performed for the object. This allows a rotation of the object to be corrected and the detection of a gesture to be made easier. The object is a hand, wherein the angle of inclination can be determined here on the basis of the position of a wrist relative to the other regions of the detected object.

In a further operation, the object is used to determine a reference point. This may involve the surface taken up by the object and/or the shape of the outline being taken into consideration.

In one development, the reference point is the geometric centroid of the object, in particular, the geometric surface centroid of the object. This makes it easier to reproducibly determine the reference point.

By way of example, the surface centroid $\vec{s}$ of an object having m picture elements that are equally weighted and each have an associated vector $\vec{x}_i$ can be calculated according to the following formula:

$$\vec{s} = \frac{1}{m}\sum_{i=1}^{m}\vec{x}_i$$

Starting from the reference point, a distance profile that comprises the distance at the outline of the object from the reference point is then produced. This can be accomplished, for example, by a pointer that extends from a reference point to a point on the outline being defined, and the length of the pointer can be determined. To produce the distance profile, this pointer can be produced and measured for a multiplicity of points along the outline, the distance profile comprising a parameterization of the outline in polar coordinates starting from the reference point, that is to say that the distance profile indicates the distance of a point on the outline from the reference point on the basis of an angle of the pointer. The distance profile is produced such that the angle of the pointer is defined in a specific manner, for example, by a pointer that points perpendicularly upward being at an angle of 0°, whereas a pointer that points perpendicularly downward is at an angle of 180°. To determine the distance profile, the angle of the pointer can sweep through the angles from 0° to 360° clockwise, for example.

In further disclosed embodiments, there may be provision for different production of the distance profile, in particular, by a different kind of parameterization of the outline of the object. For example, the points on the outline may be arranged equidistantly along the outline.

Furthermore, there may be provision for smoothing and/or filtering of the data of the distance profile to be performed, for example, by a moving average or a different filtering to reject high-frequency fluctuations and/or noise.

In at least one disclosed embodiment, a surface area of the object is determined and the measured distance profile is normalized on the basis of the determined surface area. This allows gestures to be detected independently of the actual size of the object, for example, independently of the size of a hand used to perform the gesture.

For the purposes of the normalization, it is possible for a surface area circle to be determined, for example, the center of which coincides with the reference point and the radius r of which is determined such that the surface area Acircle of the surface area circle is concordant with the surface area Aobj of the object:

$$A_{circle} = \pi * r^2 = A_{Obj}; r = \sqrt{\frac{A_{Obj}}{\pi}}$$

The distance of a point on the outline of the object from the reference point can in this case be indicated relative to the radius r, for example, by multiplication by the normalization factor $$\frac{1}{r}.$$

In this case, values above 1 indicate that the outline at a position is further away from the reference point than the radius of the surface area circle, whereas, conversely, values below 1 indicate that the outline runs inside the surface area circle.

On the basis of the measured distance profile, a gesture is determined, it being possible for this determination to be performed in different ways.

In a further development, geometric profile features of the measured distance profiles are determined and the gesture is determined on the basis of the geometric profile features. This permits particularly simple, geometric extraction of fundamental features of the distance profile.

Geometric profile features can be, for example, the number and placement of extreme values and/or points of inflection of the distance profiles. Profile features are determined in the style of a curve discussion, known per se, in which characteristic features of a mathematical curve are determined.

The determined geometric profile features can be associated with a gesture in different ways. By way of example, in at least one disclosed embodiment, there may be provision for the number of maxima of the distance profile to be associated with a gesture, for example, if a gesture is characterized by a specific number of extended fingers and the number of maxima corresponds to this very number. Alternatively or additionally, by way of example, distances between two extremes can be used for associating a gesture, for example, to detect whether two fingers arranged next to one another on one hand are extended, or the derivative of the distance profile can be used to determine further characteristic profile features.

In one development, the gesture is determined on the basis of a profile comparison in which the measured distance profiles are compared with a multiplicity of reference distance profiles, wherein the reference distance profiles each have an associated gesture. This allows specific gestures to be prescribed for the detection, and also complex gestures to be detected.

The reference distance profiles can be prescribed by a manufacturer on delivery of an apparatus for carrying out the disclosed method, for example, or can be provided at a later time. Alternatively or additionally, there may be provision for input possibilities, for example, to capture and store new reference distance profiles for a user, for example, to learn a new gesture or to improve the detection of an already known gesture.

In one development, geometric reference features are determined for the reference distance profiles, and the profile comparison is performed on the basis of the reference features and the profiles features of the measured distance profile.

The reference distance profiles can be provided in different ways. By way of example, the measured distance profile can have a specific resolution, that is to say a specific number of points on the distance profile. The reference distance profiles can be provided using the same or a different resolution; alternatively or additionally, they can comprise reference features that are determined in the style of the profile features described above that are determined for the measured distance profiles. As a result of the reference features being provided directly, the profile comparison does not require new analysis of the reference distance profiles to take place. Furthermore, this allows the complexity of the profile comparison to be reduced further.

The profile comparison can accordingly be performed such that the provided data of the reference distance profiles and the measured distance profiles can be used particularly efficiently and without unnecessarily great computational involvement.

In a further development, at least two extreme values of the measured distance profiles are determined, and the profile comparison is performed on the basis of the determined extreme values of the measured distance profiles. As a result, the profile comparison can be performed particularly easily and with correspondingly low computation power.

By way of example, the profile comparison can involve the number, placement and/or amplitude of the extreme values being taken into consideration. These parameters are particularly easily determinable and characterize the measured distance profile and also the reference distance profiles. The profile comparison can therefore be performed particularly easily. The data required for the profile comparison, for example, about the extreme values, may already have been preprocessed and stored for the reference distance profiles, so that no fresh analysis of the reference distance profiles is necessary.

In one development, a first derivative of the distance profiles is determined, and the profile comparison is performed on the basis of the determined derivative. In this case, a second derivative can furthermore be determined. This allows additional relevant parameters of the distance profile to be ascertained and the association with the reference profile to be made easier. Geometric profile features can be determined on the basis of the first and/or second derivative, for example, the number and placement of extreme values and/or points of inflection of the distance profile.

In one development, the profile comparison is performed on the basis of a machine learning method, for example, on the basis of a neural network. This allows the comparison to be performed particularly accurately. The classification and detection of a gesture on the basis of the distance profile and the profile comparison can be improved by training data.

Furthermore, there may be provision for a determined distance profile to be used to learn a new gesture. This can be performed in different ways known per se, for example, by a measured distance profile or a multiplicity of measured distance profiles being used to produce a new reference profile that is associated with a specific gesture and permits or improves detection thereof. Furthermore, a machine learning method can be used, for example, to learn a new gesture by a neural network.

In a further development, the captured image data comprise a series of images, in particular, a chronological series, and a series of measured distance profiles, in particular, chronological distance profiles, is produced. In this case, the gesture is determined on the basis of the series of measured distance profiles.

A series of images may be captured, for example, on the basis of video data. The image sequence comprises frames, which are each associated with a time. In this case, the times may be arranged equidistantly and in succession. In the method, an individual distance profile may be respectively produced for each of the frames. This may involve a new reference point being respectively determined for each individual image. Alternatively or in addition, an evaluation of the image sequence may take place in such a way that a common reference point is determined for at least two frames. Furthermore, a normalizing of the distance profile, for example, on the basis of the surface area circle described above, may take place, it likewise being possible for the normalization to be performed for the individual frames or for at least two frames.

While in the consideration of a frame a specific position of an input object, for example, a position of a hand and individual fingers, may be taken into consideration as a gesture, in the evaluation of a series of frames a change of this position may be evaluated. For example, a change in position, of the position, of an angle of the input object may be taken into consideration.

In one development, the gesture comprises a movement of the hand, for example, a change in the position of the entire hand or of individual fingers, stretching or bending of fingers, a rotation and/or a change of position of the hand or of individual fingers. The position of individual fingers relative to one another and relative to the hand can be taken into consideration in this case. In this manner, it is possible for a zoom, a displacement, a marking and/or a selection, for example, to be implemented by a gesture. Furthermore, multiple gestures carried out in succession can be detected by an image sequence.

Furthermore, it is possible to detect a gesture that is performed by a hand in such a way that the captured image data substantially comprise a depiction of the palm or the back of the hand, possibly with fingers of the hand. Moreover, there may be provision for a side view of the hand to be detected, for example, following a rotation of the hand such that an edge of the hand is directed toward the sensor. By way of example, such a position of the hand can be detected on the basis of an elongate object. Furthermore, a change in the position of the hand can be detected by a change of the properties of the detected object being identified, for example, an eccentricity, a roundness, an amplitude or repetitions within a distance profile.

The method involves the determined gesture being used to generate and output an output signal. The output signal can comprise control data for a device, to which the output signal is transmitted on output. The output in this case does not necessarily need to be performed such that information that can be acquired by a human is output, but rather may merely be performed to a device. Alternatively or additionally, however, an output perceptible to human beings can be performed, for example, by the output signal being taken as a basis for producing and outputting a visually, optically and/or audibly perceptible output, the output being performed by an output unit.

The disclosed apparatus for detecting a user input on the basis of a gesture comprises a capture unit, by which image data are capturable, and a segmentation unit, by which a segmentation can be carried out on the basis of the captured image data, it being possible to determine an object with an outline. The apparatus also comprises a profile calculation unit, by which a reference point is determined on the basis of the object, a distance from the reference point being respectively determinable for a multiplicity of points on the outline of the object and a measured distance profile being producible on the basis of the distances. It also comprises an association unit, by which a gesture is determinable on the basis of the measured distance profile, and also an output unit, by which an output signal can be generated on the basis of the determined gesture and can be output.

The disclosed apparatus is designed to implement the method described above. The disclosed apparatus therefore has the same benefits as the disclosed method.

The output unit comprises an interface by which the output signal is transmittable to another device, an output perceptible to human users not necessarily being produced. The output can be transmitted to a further device in a manner known per se, for example, so that gesture control is implemented for this device.

The apparatus is arranged in a transportation vehicle and/or included by the transportation vehicle.

Referring to FIG. 1, a transportation vehicle with an exemplary embodiment of the disclosed apparatus is explained.

A transportation vehicle 1 comprises a capture unit 4 coupled to a control unit 2. It further comprises a device 3, in the exemplary embodiment shown a radio 3, and a memory unit 9, which are both likewise coupled to the control unit 2. In this case, the control unit 2 comprises a segmentation unit 5, a profile calculation unit 6, an association unit 7 and an output unit 8.

In the exemplary embodiment, the capture unit 4 comprises a Time-of-Flight camera 4, designed in a manner known per se. Light pulses in the infrared range are transmitted and reflected from objects. Such light reflected by objects in a capture region is detected, and the time offset that occurs between the transmitting of the light pulse and the detection of the reflected light is determined for a matrix of picture elements of the Time-of-Flight camera 4. The time offset and the speed of light are used to calculate the path of travel of the light and the distance of the reflecting object. The data produced on detection can be used to produce image data, wherein each picture element has associated distance information, for example, a value for the distance of a reflecting object. Furthermore, data about a detected intensity, a scatter or other parameters can be captured.

In further exemplary embodiments, the capture unit 4 can alternatively or additionally comprise other sensors or detector types, for example, a stereo camera, an ultrasonic system, a laser scanner or other unit with similar operation, which allow the determination of distance information for the image data, in particular. Furthermore, there may be provision for a capture unit 4 that involves the image data being determined without distance information, for example, using a simple camera.

In the exemplary embodiment, there is further provision for the capture unit 4 to capture a series of frames. The captured image data in this case comprise video data. In another exemplary embodiment, however, there may also be provision for only frames to be captured.

Figure 2:
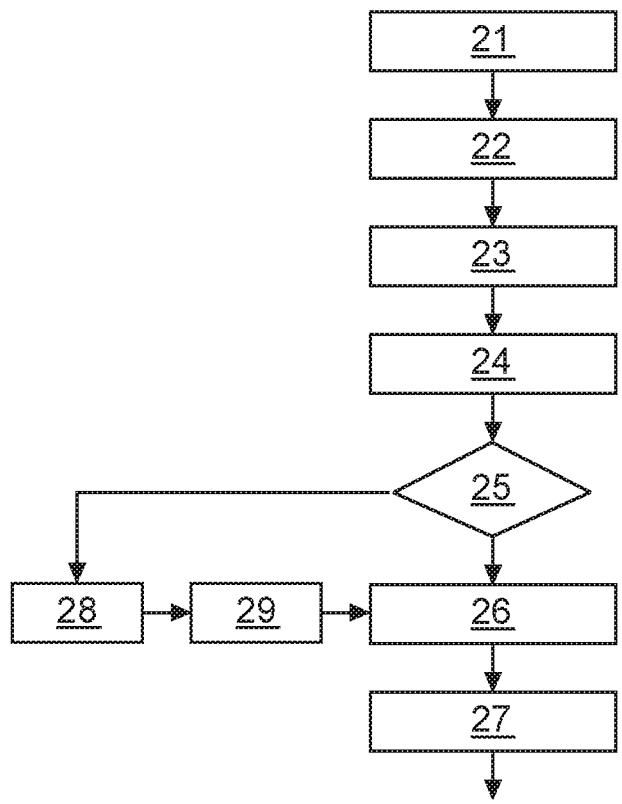
FIG. 2 shows an exemplary embodiment of the disclosed method.

Referring to FIG. 2, an exemplary embodiment of the disclosed method is explained. The starting point in this case is the exemplary embodiment of the disclosed apparatus that is explained above with reference to FIG. 1.

In a first operation at 21, the capture unit 4 captures image data. In the exemplary embodiment, the image data comprise picture elements from frames, which are each associated with a time. A series of chronological frames is captured; in other exemplary embodiments, individual frames may be captured.

The image data are transmitted to the control unit 2, where they are processed further. In a second operation at 22, the signal conditioning takes place in a manner known per se, with, for example, frames within the image data being able to be detected, for example, for the case of a video sequence. Furthermore, besides the actual image data, it is also possible for metadata to be read in, for example, image information about a time data associated with a frame or further information. Furthermore, it is possible for filtering and/or calibration to be performed.

In a further operation at 23, the segmentation unit 5 of the apparatus performs a segmentation. This is performed in a way known per se and an object with an outline is determined on the basis of the image data. The object is determined on the basis of coherent picture elements that have associated content. During the segmentation, objects or picture elements that are not to be detected are identified and removed, wherein a multistage method can be used.

In the exemplary embodiment, there is provision for a gesture performed by a hand to be detected. In the segmentation in operation at 23, first the wrist adjoining the hand and the arm are identified and removed from the image, since these regions are not to be used for gesture detection. Furthermore, there may be provision for an angle of inclination of the hand to be determined and compensated for, with the positions of the filtered-out wrist being able to be used, for example. In the segmentation operation at 23, an object within at least one frame is determined and an outline is determined, defined, for example, as the profile of the outermost edge of the object or as a line through the centers of the picture elements arranged at the edge of the object.

In further exemplary embodiments, it is alternatively or additionally possible for a gesture performed using another input object to be captured and detected. The segmentation operation at 23 is then performed in an accordingly adapted manner.

In further exemplary embodiments, the signal conditioning 22 and/or the segmentation 23 involve further methods for image processing that are known per se being used, for example, to detect a specific input object, in particular, a hand, and to distinguish objects are not to be detected, for example, in the background of a frame.

In a further operation at 24, extraction of features on the basis of the object determined during the segmentation is performed. This is accomplished in the exemplary embodiment by a surface area circle being determined, with the geometric centroid of the surface of the detected object first being determined as the center of the surface area circle. To parameterize the surface area circle, a radius is furthermore determined such that the surface area of the surface area circle is equal to the surface area of the determined object.

In a further operation, the profile calculation unit 6 determines a distance profile, wherein the outline of the object is parameterized by polar coordinates with their origin at the center of the surface area circle. This can be accomplished, for example, by a pointer that has its origin at the center of the surface area circle and extends up to the outline of the object being defined. The distance profile indicates the length of this pointer on the basis of an angle that the pointer forms with a line pointing perpendicularly upward and running through the center. For example, the distance profile is produced such that the length of the pointer is plotted over a complete revolution clockwise from a position pointing perpendicularly upward. The angle of the pointer can be indicated in radians, for example, and normalized to 1 by the normalization factor ½π. Furthermore, the distance profile can be normalized on the basis of the radius r of the surface area circle, that is to say by the normalization factor 1/r, so that values of the distance profile vary by a normalized value of 1.

In further exemplary embodiments, the distance profile can be determined for points arranged equidistantly along the outline.

Optionally, the processing of the distance profile can be performed, for example, by smoothing, to reject noise.

Features of the distance profile are extracted, wherein in particular calculations in the style of a curve discussion are performed. A first and a second derivative of the distance profile is determined. In the exemplary embodiment, there is provision for shape-based features to be extracted, in particular positions, distances and/or amplitudes of extremes of the distance profile and also the positions of points of inflection.

By way of example, a gesture performed by an at least partly open hand facing the sensor of the capture unit 4 can result in a number of extended fingers being ascertained on the basis of the number of extracted maxima of the distance profile. This can involve further methods being used, for example, to avoid misdetections, by taking into consideration threshold values for a minimal or maximal amplitude of an extreme value or for a specific width of the curve shape in surroundings of the extreme.

In further exemplary embodiments, it is alternatively or additionally possible for further features to be extracted.

In a further operation at 25, the exemplary embodiment involves distinguishing whether detection of a gesture is to be performed or whether the system is to be trained, for example, to learn a gesture afresh or to improve the detection of a known gesture.

If a gesture is to be detected, a classification is performed by the association unit 7 in a operation at 26. This can be referred to as execution of the method in an "online mode", in which a gesture is to be detected and an applicable output signal is to be generated and output. In this case, the exemplary embodiment involves the previously determined distance profile and/or the extracted profile features being used to determine an associated gesture. In this case, specific features may be associated with specific gestures, for example, a specific number of maxima of the distance profile. In that case, it is possible to distinguish whether one or more fingers are extended, and just the number of extended fingers can permit the association of a gesture.

The classification can take place in multiple stages if need be, for example, by a classification first being performed on the basis of specific features and subsequently being refined on the basis of further features.

Furthermore, a profile comparison can be performed, with reference profiles that are provided by the memory unit 9 in the exemplary embodiment being used. The profile comparison can take place in different ways.

By way of example, a preprocessing can be performed for the reference profiles, analogously to the extraction of features of the distance profiles and the trajectory in operation at 24. The result of such a preprocessing for the reference profiles can be obtained even before the method is carried out, and the resulting profile features can be stored and provided. The profile comparison can then be performed comparatively easily, for example, by the number of extremes, their shape and placement, if need be in relation to one another, and/or the curve shape between the extremes, for example, on the basis of the parameters of the points of inflection, being taken into consideration.

For the purpose of detecting the object and, in particular, for the purpose of associating the gesture with the object, representations for specific gestures are examined and compared with the determined distance profile at the time of execution of a program for carrying out the method, for example, for an object detected in a frame. The representations are stored in a microcontroller and in this way can be examined and evaluated particularly quickly at the time of execution. The representations can comprise features from a training run in which training for the detectable gestures is performed. If a gesture is detected during such examination, this result can be reported to a superordinate system, or an output signal can be generated and output.

In another disclosed embodiment, the profile comparison can be performed on the basis of a machine learning method, in particular, by a neural network. This typically requires a higher computation power, but can be used for detecting gestures on the basis of more complex distance profiles, in particular. By way of example, the entire distance profile and possibly applicable data from reference profiles are used for the profile comparison in the present case. Not just individual extracted profile features are taken into consideration for the profile comparison in the present case.

In further exemplary embodiments, the profile comparison can be performed in another way, the distance profile being assigned a reference profile or a group of reference profiles. The reference profiles are each associated with a gesture.

After a gesture has been determined on the basis of the captured image data, a post-processing is performed in a further operation at 27, with an output signal being generated and output by the output unit 8. In the exemplary embodiment, there is provision for the output signal to comprise a control signal for the device 3, in this case the radio 3, and to be transmitted to the latter, with no output discernible by a human user being performed. The gesture control of the radius 3 is performed in a manner known per se, with, for example, a radio station being able to be selected when a gesture with a specific number of fingers is detected. In further exemplary embodiments, the output can be output in a manner perceptible to the user, for example, by a visually perceptible display.

In further exemplary embodiments, other devices 3 can be controlled by a gesture control, the gesture being used to capture an input.

If it is detected in decision operation at 25 that training of the gesture detection is to be performed, a model training is performed in a operation at 28 and a model is generated in a further operation at 29. This can be stored in an nonvolatile state by the memory unit 9 and can be provided for later passes. The execution of the training can be performed as an "offline mode", that is to say without an output signal being generated. The model generated afresh in the process is altered in comparison with an earlier model, for example, to better detect a known gesture, or a new model can be produced, for example, for a gesture that is to be learned afresh. A model can comprise reference profiles or comparable data, which can be used to detect a gesture on the basis of a distance profile and/or a trajectory. Optionally, it is subsequently possible for a classification for detecting a gesture and generation and output of an output signal to take place.

In a further exemplary embodiment, a classifier of a neural network can be trained or another machine learning method can be performed.

The methods in the online or offline mode that are explained above can, depending on the known object and application, be carried out individually or in succession, it being necessary to take into consideration that the detection reliability for a gesture can typically be improved by repeated training.

Referring to FIGS. 3A to 8B, exemplary embodiments of objects and associated distance profiles are explained, as can arise in the disclosed method. The starting point in this case is the exemplary embodiment of the disclosed apparatus that is described above with reference to FIG. 1 and the exemplary embodiments of the disclosed method that is described above with reference to FIGS. 2A to 2C.

The image shown in each of the FIGS. 3A, 4A, 5A, 6A, 7A and 8A corresponds to a depiction, captured by the capture unit 4, of an input object after a segmentation operation in which an object 31 has been identified. For each picture element, an intensity reflected by the input object and/or a distance value can be captured, for example. The graphs in FIGS. 3B, 4B, 5B, 6B, 7B and 8B each show at least part of the respective distance profile 37 that has been obtained in a training run, that is to say in an offline mode of the disclosed method, in the example. The features captured on the basis of the objects 31 detected in the image data can be stored completely, for example, as image data, or in a compressed form, for example, by the profile features being extracted and stored.

Figure 3A:
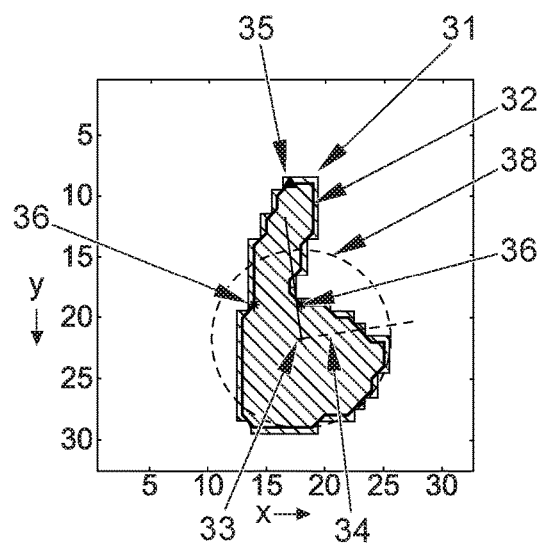
FIGS. 3A to 8B show exemplary embodiments of objects and associated distance profiles as may arise in the disclosed method.

In the example shown in FIG. 3A, an object 31 has been detected within a frame of the image data, the object corresponding to a hand with an extended finger, for example. For the object 31, an outline 32 that corresponds to a solid line through the respective centers of the pixels of the object 31 has been produced. Furthermore, a surface area circle 38 has been determined, the center 33 of which coincides with the centroid of the object 31 and the radius 34 of which has been chosen such that the surface area of the surface area circle 38 is concordant with the surface area of the object 31.

The outline 32 of the object 31 is parameterized to produce a distance profile 37. This is accomplished by the distance from the center 33 of the surface area circle 38 being determined for points along the outline 32 and being normalized on the basis of the radius 34 of the surface area circle 38. That is to say that the points of intersection between the outline 32 and the surface area circle 38 each have a distance of 1. The distance profile 37 indicates the normalized distance of the points on the outline 32 on the basis of their position on the outline 32, the position being calculated as a distance along the outline 32, beginning at any point on the outline 32.

In further exemplary embodiments, the distance profile 37 can indicate the normalized distance on the basis of an angle that the connecting line between the center 33 and the point on the outline 32 forms with a perpendicular line, for example.

Figure 3B:
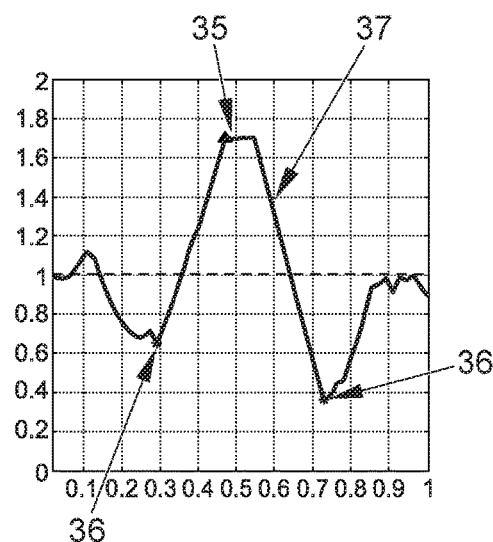

The distance profile 37 of the object 31 shown in FIG. 3A is shown in FIG. 3B. A portion of the distance along the outline 32, normalized to values between 0 and 2, is shown along the X axis. The portion requiring consideration can be determined in a manner known per se. The portion comprises the extremes shown in FIG. 3A, namely 2 minima 36 (shown as asterisks) and a maximum 35 (shown as a triangle). The extremes 35, 36 are determined in a manner known per se, in particular, by the first and second derivatives of the distance profile 37 and possibly a smoothing. Furthermore, it is possible for threshold values to be taken into consideration, for example, by a maximum 35 being detected only when there is a rise above a lower threshold value and a minimum 36 being detected only when there is a drop below an upper threshold value.

In the example shown in FIGS. 3A and 3B, the distance profile 37 can be used to identify a maximum 35 corresponding to an extended finger, for example, That is to say that such a gesture can already be detected on the basis of the distance profile 37.

In further exemplary embodiments, there is provision for the distance profile 37 to be compared with one or more reference profiles. This profile comparison can involve the curve shapes being compared, and/or profile features can be extracted and compared, for example, to check whether the measured distance profile 37 has the same number of maxima 35 as a reference profile. In further exemplary embodiments, a neural network or other method can be used to perform the profile comparison.

The data captured in an offline mode in this example can be used to generate a model, for example, to learn a new gesture, by the extracted features 35, 36 being deposited in a manner stored in a model and being retrievable later as a reference model. Furthermore, it is possible for a model, that is to say one or more reference profiles associated with the gesture detected in the present case, to be updated and stored.

Figure 4A:
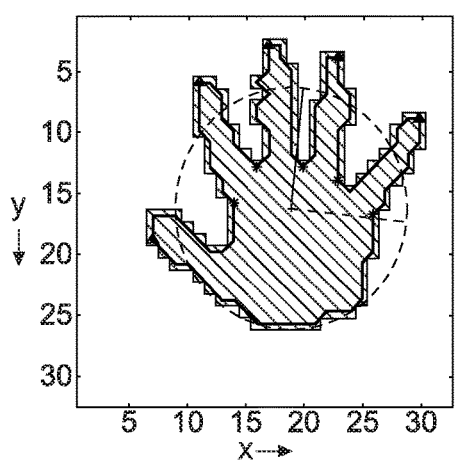
Figure 4B:
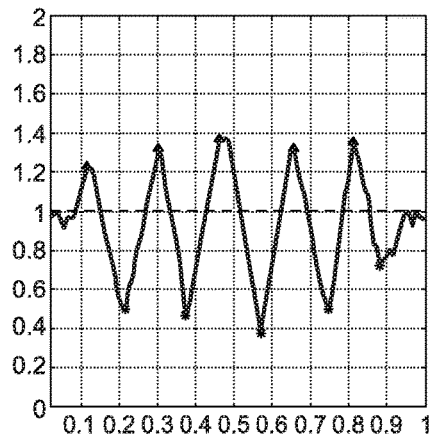

In the example shown in FIGS. 4A and 4B, image data for an open hand having five fingers have been captured. In the manner described above, a distance profile 37 that is shown in FIG. 4B has been determined. The distance profile 37 can be used to identify five maxima 35 (shown as triangles), which corresponds to the number of extended fingers in the example.

Figure 5A:
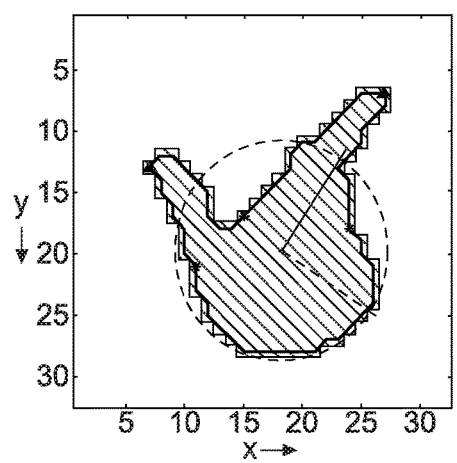
Figure 5B:
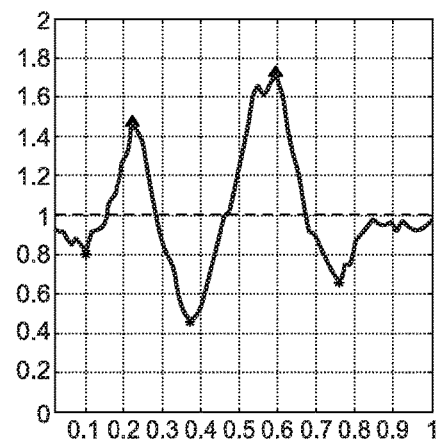

In the example shown in FIGS. 5A and 5B, image data for a hand having two extended fingers, for example, thumb and index finger, have been captured. In the manner described above, a distance profile that is shown in FIG. 5B and in which two maxima 35 (shown as triangles) are identified has been determined. In the example, this corresponds to the number of extended fingers. Furthermore, the curve shape can be analyzed and, for example, the distance of the maxima 35 associated with the extended fingers can be evaluated. The detected gesture can be interpreted as a zoom gesture.

Figure 6A:
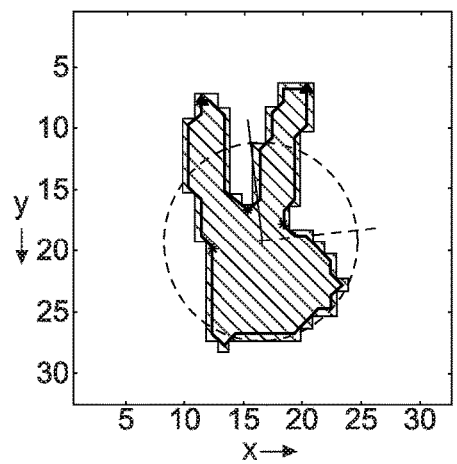
Figure 6B:
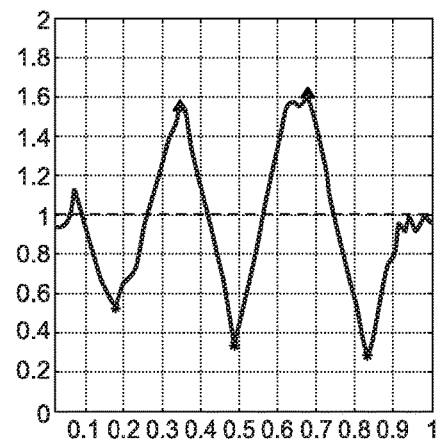

In the example shown in FIGS. 6A and 6B, image data for a hand having two extended fingers, for example, index finger and middle finger, have been captured—in a similar manner to in the example shown in FIGS. 5A and 5B. In the manner described above, a distance profile that is shown in FIG. 6B and in which two maxima 35 (shown as triangles) are identified has been determined. In the example, this corresponds to the number of extended fingers. To distinguish this gesture from the gesture shown above with reference to FIGS. 5A and 5B, it is possible for the first and second derivatives of the distance profiles to be taken into consideration, for example, That is to say that the shape at the rise and the amplitude level are included in a model association with the respective gesture. By way of example, in the case shown it is possible to establish how far the two maxima 35 are from one another and/or how steeply the distance profile 37 runs between the maxima 35.

In further exemplary embodiments, a neural network or a comparable method can be used to detect a gesture on the basis of the distance profile 37. Such detection is typically much more complex than the described detection by individual profile parameters, which can easily be determined using curve discussion methods or mechanisms.

In the examples mentioned above, hands have been considered as input objects. In further exemplary embodiments, other items and input objects, for example, a foot, head or an everyday item, can also be used to capture gestures. This can be accomplished by models, in particular, with reference profiles, being produced and stored. If the same number of extremes 35, 36 and points of inflection in the respective distance profiles arise for different gestures, the derivatives of the distance profiles 37 and their respective features can be used to detect a gesture. In the disclosed method, this involves very small memory sizes being used in comparison with other techniques, for example, below 50 bytes per object, and particularly fast processing can be ensured, for example, by a microcontroller with low computation power below 1 Mips (million instructions per second).

The distance profiles 37 can alternatively or additionally be used to extract various other profile features, for example, an eccentricity, a roundness, a swing of an amplitude, an inclination in space and/or repetitions of the curve, for example, the detection of a periodicity.

The described exemplary embodiments of the disclosed method further involve the normalization on the basis of the radius 34 of the surface area circle 38 being used to ensure that gestures with an input objects of different sizes, for example, different hands, can be detected.

Figure 7A:
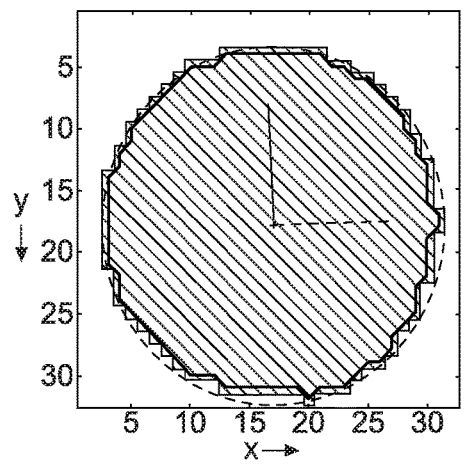
Figure 7B:
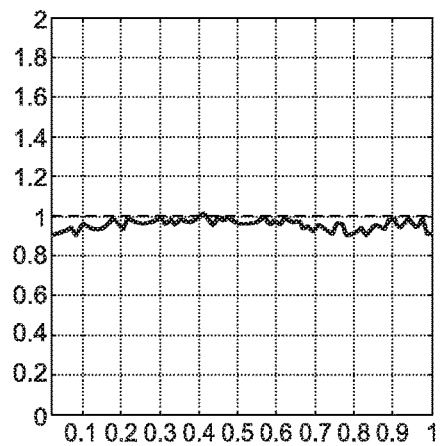

In the example shown in FIGS. 7A and 7B, image data for a round surface area, for example, of a sphere or of a circular sign, have been captured. In the manner described above, a distance profile 37 that is shown in FIG. 7B and exhibits a shape that is substantially parallel to the outline 32 of the surface area circle 38 has been determined. No extremes 35, 36 of the curve are detected. Such a line can thus be used to identify a circular input object.

Figure 8A:
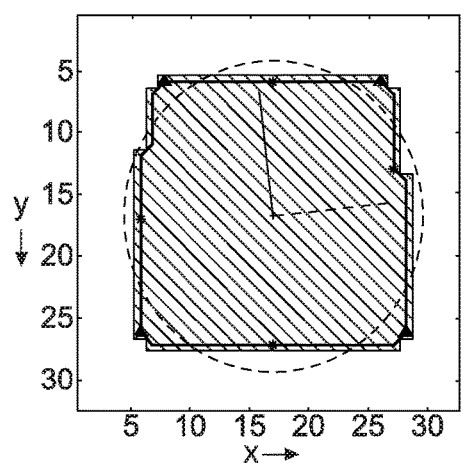
Figure 8B:
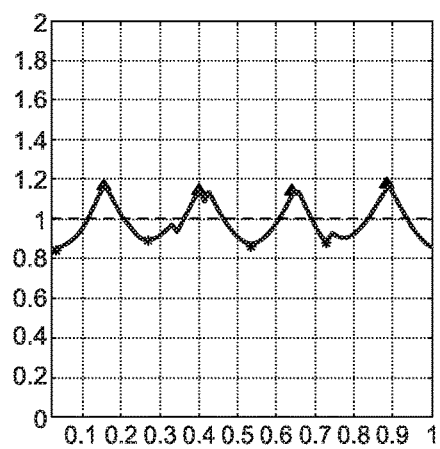

In the example shown in FIGS. 8A and 8B, image data for a rectangular parallelepiped have been captured. In the manner described above, a distance profile 37 that is shown in FIG. 8B and has four maxima 35 at regular intervals, between which maxima there are four minima 36 arranged, likewise at regular intervals, has been determined. Furthermore, for example, the captured derivative and possibly the second derivative can be used to determine that the shape of the distance profile is repeated substantially periodically between the maxima 35. Such a line can thus be associated with a square input object.

Features as in the cases explained above with reference to FIGS. 7A to 8B can be used, for example, to distinguish between different input objects, for example, a hand, a foot and a head.

In further exemplary embodiments, image data are further captured by a camera such that other image processing methods, for example, neural networks, can be used to detect different input objects, image processing methods that are known per se being used. This allows, for example, a specific input object, for example, a hand, to be captured and located to facilitate the segmentation of the image data and/or to define a capture space in which the input object has been located. The detection of a gesture by the disclosed method can then be limited to a specific range of the image data and performed more quickly.

In further disclosed embodiments, it is possible for features formed by outlines other than the outermost outline 32 of the object 31 detected during the segmentation to be taken into consideration. By way of example, the object 31 detected during the segmentation can have a "hole", that is to say a region surrounded by the surface area of the object 31 that is itself not part of the object 31. Such a region can be formed, for example, in the event of a hand gesture such as the "OK" signal widely used among divers. An enclosed region of this kind can be used as a further feature for detecting a gesture. Furthermore, there may be provision for parameterization of the enclosed region to take place and for parameters thus obtained in the process likewise to be taken into consideration for detecting the gesture.

In a further exemplary embodiment, the image data comprise a chronological sequence of frames. In this case, an evaluation of each of the individual images on their own may be performed or a change of a gesture over the course of a time may be determined. Alternatively or additionally, the duration of the capture of a gesture can be captured. In these cases, the image data are processed essentially as described above, the image data of the respective frames being able to be analyzed separately. Alternatively or additionally, gestures may be characterized by a sequence of changes in the measured distance profiles 37, for example, a zoom gesture, in the case of which the distance between two extended fingers is changed, this being able to be detected on the basis of changing distances between the maxima 35 in the distance profiles 37. Further gestures may alternatively or additionally be provided for and detected in a manner known per se.

LIST OF REFERENCE SIGNS

1 Transportation vehicle
2 Control unit
3 Device; radio
4 Capture unit; Time-of-Flight (ToF) camera
5 Segmentation unit
6 Profile calculation unit
7 Association unit
8 Output unit
9 Memory unit
21 Capture of image data
22 Signal conditioning
23 Segmentation
24 Extraction of features
25 Decision between training or detecting
27 Classification
28 Post-processing
29 Model training
31 Generation of a model
32 Frame object; hand
33 Outline
33 Reference point; center
34 Radius
35 Profile feature; extreme value; maximum
36 Profile feature; extreme value; minimum
37 Distance profile
38 Surface area circle

The invention claimed is:

1. A method for detecting a user input based on a gesture, the method comprising:
    capturing image data;
    using the captured image data to perform a segmentation, wherein an object with an outline is determined;
    using the object to determine a reference point;
    determining a distance from the reference point for a multiplicity of points on the outline of the object and using the distances to generate a measured distance profile, the measured distance profile comprising the distance of the outline of the object to the reference point;
    using the measured distance profile to determine a gesture; and using the gesture determined to generate and output an output signal.

2. The method of claim 1, wherein the captured image data comprise an at least partial depiction of a hand and the gesture corresponds to a number of extended fingers of the hand.

3. The method of claim 1, wherein the captured image data comprise picture elements and the picture elements have associated distance information.

4. The method of claim 1, wherein an angle of inclination of the object is determined and an equalizing transformation is performed for the object.

5. The method of claim 1, wherein the reference point is the geometric centroid of the object.

6. The method of claim 1, wherein a surface area of the object is determined and the measured distance profile is normalized based on the determined surface area.

7. The method of claim 1, wherein geometric profile features of the measured distance profile are determined and the gesture is determined based on the geometric profile features.

8. The method of claim 1, wherein the gesture is determined based on a profile comparison in which the measured distance profile is compared with a multiplicity of reference distance profiles, wherein the reference distance profiles each have an associated gesture.

9. The method of claim 8, wherein geometric reference features are determined for the reference distance profiles and the profile comparison is performed based on the reference features and the profiles features of the measured distance profile.

10. The method of claim 8, wherein at least two extreme values of the measured distance profile are determined and the profile comparison is performed based on the determined extreme values of the measured distance profile.

11. The method of claim 8, wherein a first derivative of the distance profile is determined and the profile comparison is performed based on the determined derivative.

12. The method of claims of claim 8, wherein the profile comparison is performed based on a machine learning method.

13. The method of claim 1, wherein the captured image data comprise a series of images and a series of measured distance profiles is produced, the gesture being determined based on the series of measured distance profiles.

14. The method of claim 13, wherein the gesture comprises a movement of a hand.

15. An apparatus for detecting a user input based on a gesture, the apparatus comprising:
a capture unit, by which image data are capturable;
a segmentation unit, by which a segmentation is carried out based on the captured image data, it being possible to determine an object with an outline;
a profile calculation unit, by which a reference point is determinable based on the object, a distance from the reference point being respectively determinable for a multiplicity of points on the outline of the object and a measured distance profile being producible based on the distances the measured distance profile comprising the distance of the outline of the object to the reference point;
an association unit, by which a gesture is determinable based on the measured distance profile; and
an output unit, by which an output signal is generated based on the determined gesture and is output.

16. The apparatus of claim 15, wherein the captured image data comprise an at least partial depiction of a hand and the gesture corresponds to a number of extended fingers of the hand.

17. The apparatus of claim 15, wherein the captured image data comprise picture elements and the picture elements have associated distance information.

18. The apparatus of claim 15, wherein an angle of inclination of the object is determined and an equalizing transformation is performed for the object.

19. The apparatus of claim 15, wherein the reference point is the geometric centroid of the object.

20. The apparatus of claim 15, wherein a surface area of the object is determined and the measured distance profile is normalized based on the determined surface area.

21. The apparatus of claim 15, wherein geometric profile features of the measured distance profile are determined and the gesture is determined based on the geometric profile features.

22. The apparatus of claim 15, wherein the gesture is determined based on a profile comparison in which the measured distance profile is compared with a multiplicity of reference distance profiles, wherein the reference distance profiles each have an associated gesture.

23. The apparatus of claim 22, wherein geometric reference features are determined for the reference distance profiles and the profile comparison is performed based on the reference features and the profiles features of the measured distance profile.

24. The apparatus of claim 22, wherein at least two extreme values of the measured distance profile are determined and the profile comparison is performed based on the determined extreme values of the measured distance profile.

25. The apparatus of claim 22, wherein a first derivative of the distance profile is determined and the profile comparison is performed based on the determined derivative.

26. The apparatus of claim 22, wherein the profile comparison is performed based on a machine learning method.

27. The apparatus of claim 15, wherein the captured image data comprise a series of images and a series of measured distance profiles is produced, the gesture being determined based on the series of measured distance profiles.

28. The apparatus of claim 15, wherein the gesture comprises a movement of a hand.

* * * * *